(12) United States Patent
Perez

(10) Patent No.: US 9,616,721 B2
(45) Date of Patent: Apr. 11, 2017

(54) UNIVERSAL OFFSET LAWN MOWER TOWING DEVICE

(71) Applicant: William Perez, Summerfield, FL (US)

(72) Inventor: William Perez, Summerfield, FL (US)

(*) Notice: Subject to any disclaimer, the term of this patent is extended or adjusted under 35 U.S.C. 154(b) by 3 days.

(21) Appl. No.: 14/830,269

(22) Filed: Aug. 19, 2015

(65) Prior Publication Data

US 2017/0050480 A1    Feb. 23, 2017

(51) Int. Cl.
*B62D 53/00*     (2006.01)
*B60D 1/167*     (2006.01)
*B60D 1/00*     (2006.01)

(52) U.S. Cl.
CPC ...... *B60D 1/1675* (2013.01); *B60D 2001/008* (2013.01)

(58) Field of Classification Search
CPC ............................... B62D 53/00; B62D 53/005
USPC ..................... 56/6; 172/313, 314; 280/411.1
See application file for complete search history.

(56) References Cited

U.S. PATENT DOCUMENTS

| | | | | |
|---|---|---|---|---|
| 1,243,598 A * | 10/1917 | Funk | .................. | B62D 13/00 180/320 |
| 1,414,770 A * | 5/1922 | Blain | .................. | B60D 1/44 280/467 |
| 1,467,375 A * | 9/1923 | Hagadone | ............ | A01D 67/005 56/16.3 |
| 1,797,660 A * | 3/1931 | Hughes | .................. | B60D 1/14 172/314 |
| 1,811,041 A * | 6/1931 | Dennis | .................. | A01C 7/18 111/54 |
| 2,173,652 A * | 9/1939 | Lee | .................. | B60G 11/18 267/277 |
| 2,564,355 A * | 8/1951 | Danuser | .................. | E02F 3/7627 172/445.2 |
| 3,514,126 A * | 5/1970 | Fuss | .................. | A01D 75/306 280/103 |
| 3,757,500 A * | 9/1973 | Averitt | .................. | A01D 75/30 280/474 |
| 3,832,834 A * | 9/1974 | Kovacs | .................. | A01D 75/30 56/6 |
| 4,029,333 A * | 6/1977 | Christensen | ............ | B60D 1/07 280/416.1 |
| 4,063,748 A * | 12/1977 | Schmidt | .................. | A01D 75/30 280/472 |
| 4,561,797 A * | 12/1985 | Aldridge | .................. | A01D 75/30 172/314 |
| 4,637,625 A * | 1/1987 | Blackwell | .................. | B60D 1/42 172/314 |
| 4,744,580 A * | 5/1988 | Ryan | .................. | B60D 1/02 56/6 |

(Continued)

Primary Examiner — Joseph Rocca
Assistant Examiner — Conan Duda
(74) Attorney, Agent, or Firm — Jason T. Daniel, Esq.; Daniel Law Offices, P.A.

(57) ABSTRACT

A universal offset lawn mower towing device includes a hitch engagement unit having a first elongated shaft with an opening along one end. An offset adjustment unit having a second elongated shaft member is slidingly positioned within the first elongated shaft, and further includes a semi-circular plate with a plurality of alignment apertures. A pair of mower attachment arms extend outward from the semi-circular plate and include mower attachment nuts along their distal ends. A safety tether includes an elongated steel cable that runs the length of the device, and connects the safety handle of the upright mower to the riding mower.

13 Claims, 9 Drawing Sheets

(56) References Cited

U.S. PATENT DOCUMENTS

| | | | | |
|---|---|---|---|---|
| 4,815,259 A * | 3/1989 | Scott | A01D 75/306 | 280/411.1 |
| 4,870,810 A * | 10/1989 | Gordy | A01D 75/30 | 172/313 |
| 4,896,485 A * | 1/1990 | Gordy | A01D 75/30 | 172/313 |
| 4,926,621 A * | 5/1990 | Torras | A01D 75/30 | 280/494 |
| 5,025,616 A * | 6/1991 | Moss | A01B 51/00 | 111/57 |
| 5,423,565 A * | 6/1995 | Smith | B60D 1/07 | 172/313 |
| 5,715,663 A * | 2/1998 | Getz | A01D 34/668 | 56/136 |
| 5,749,593 A * | 5/1998 | Phillips | B60D 1/465 | 280/405.1 |
| 5,851,020 A * | 12/1998 | Godwin | A01D 75/30 | 280/413 |
| 6,139,192 A * | 10/2000 | Chiang | F16C 35/077 | 384/458 |
| 6,176,504 B1 * | 1/2001 | Van Mill | B60D 1/62 | 280/444 |
| 6,336,312 B1 * | 1/2002 | Bednar | A01D 75/30 | 56/13.6 |
| 6,692,010 B1 * | 2/2004 | Johnson | A01D 34/001 | 280/32.7 |
| 6,739,612 B2 * | 5/2004 | Colistro | A01B 59/042 | 172/313 |
| 7,347,036 B1 * | 3/2008 | Easley, Jr. | A01D 75/30 | 172/313 |
| 7,484,748 B2 * | 2/2009 | Friggstad | B62D 13/00 | 280/408 |
| 7,571,591 B2 * | 8/2009 | Pickles | B60D 1/00 | 56/6 |
| 7,793,487 B1 * | 9/2010 | Schnell | A01D 75/306 | 56/11.6 |
| 2002/0011055 A1 * | 1/2002 | Meyer | A01D 75/303 | 56/6 |
| 2002/0056261 A1 * | 5/2002 | Tironi | A01D 75/30 | 56/6 |
| 2011/0277434 A1 * | 11/2011 | Jackson | A01D 34/66 | 56/11.6 |

* cited by examiner

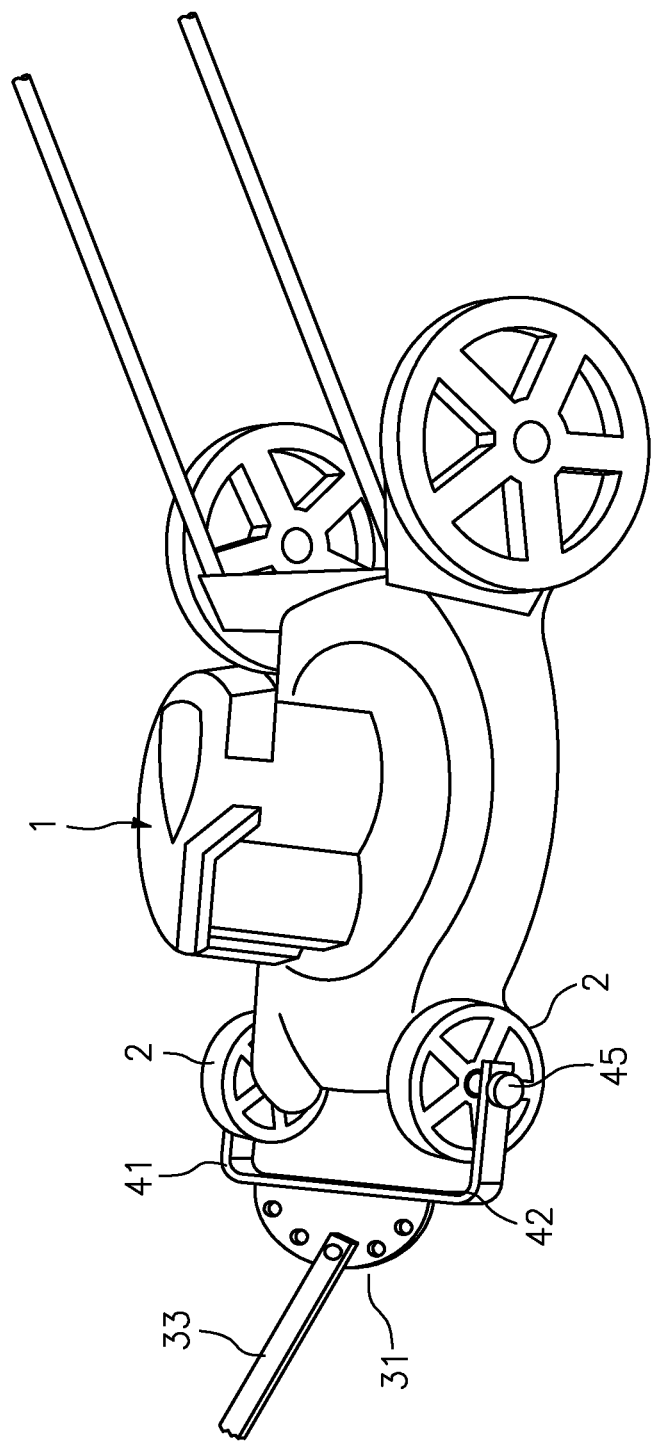

UNIVERSAL OFFSET LAWN MOWER TOWING DEVICE

TECHNICAL FIELD

The present invention relates generally to power lawn mowers, and more particularly to a towing device that can secure an upright mower to a riding mower, in order to increase an overall cutting surface.

BACKGROUND

The statements in this section merely provide background information related to the present disclosure and may not constitute prior art.

Many individuals with large yards choose to purchase a riding lawn mower to ease the task of cutting their lawn. To this end, residential mowers are typically manufactured to have a cutting diameter of between 40 and 42 inches, and cost around $1,000. Although useful for yards having an acre or less, the relatively small cutting diameter of these riding mowers still requires an inordinate amount of time to mow large plots of land having multiple acres.

In addition to the above, riding mowers do not typically perform precise cutting patterns, such as around gardens or other such locations where tight turns are required. As such, even with the riding mower, users must still purchase and utilize a traditional upright (i.e., walk-behind) lawn mower.

Although there are many known commercial grade riding lawn mowers that include a cutting diameter of between 60 and 80 inches, the cost of these units, typically at or above $10,000, is unachievable for use at a single residence. As such, it would be beneficial to provide a lawn mower towing device which can securely position an upright mower behind a riding lawn mower in an offset manner, so as to utilize the cutting ability of both mowers simultaneously.

SUMMARY OF THE INVENTION

The present invention is directed to a universal offset lawn mower towing device. One embodiment of the present invention can include an offset adjustment unit having a semi-circular plate with a plurality of alignment apertures. Each of the alignment apertures represent an offset angle from a center line of a riding lawn mower. An elongated shaft is pivotally secured to the semi-circular plate and functions to mate with a hitch engagement unit that connects to the hitch of the riding lawn mower.

A pair of mower attachment arms extend outward from the semi-circular plate and include mower attachment nuts along their distal ends. The mower attachment nuts can engage the central bolts of the front wheels of the upright lawn mower, and allow the lawn mower to be towed behind the riding mower.

In one embodiment, the attachment nuts allow the offset adjustment unit to transition between a generally horizontal position when the device is in use, and a generally vertical position when the device is not being towed behind a riding mower.

Another embodiment of the present invention can include a safety tether that connects the safety handle of the upright mower to the riding mower. The safety tether can function to disable the upright mower engine in the event the upright mower becomes separated from one or both of the riding mower and the towing device.

This summary is provided merely to introduce certain concepts and not to identify key or essential features of the claimed subject matter.

BRIEF DESCRIPTION OF THE DRAWINGS

Presently preferred embodiments are shown in the drawings. It should be appreciated, however, that the invention is not limited to the precise arrangements and instrumentalities shown.

FIG. 4B is a side view of the towing device in operation, in accordance with one embodiment of the invention.

DETAILED DESCRIPTION OF THE INVENTION

Figure 1:
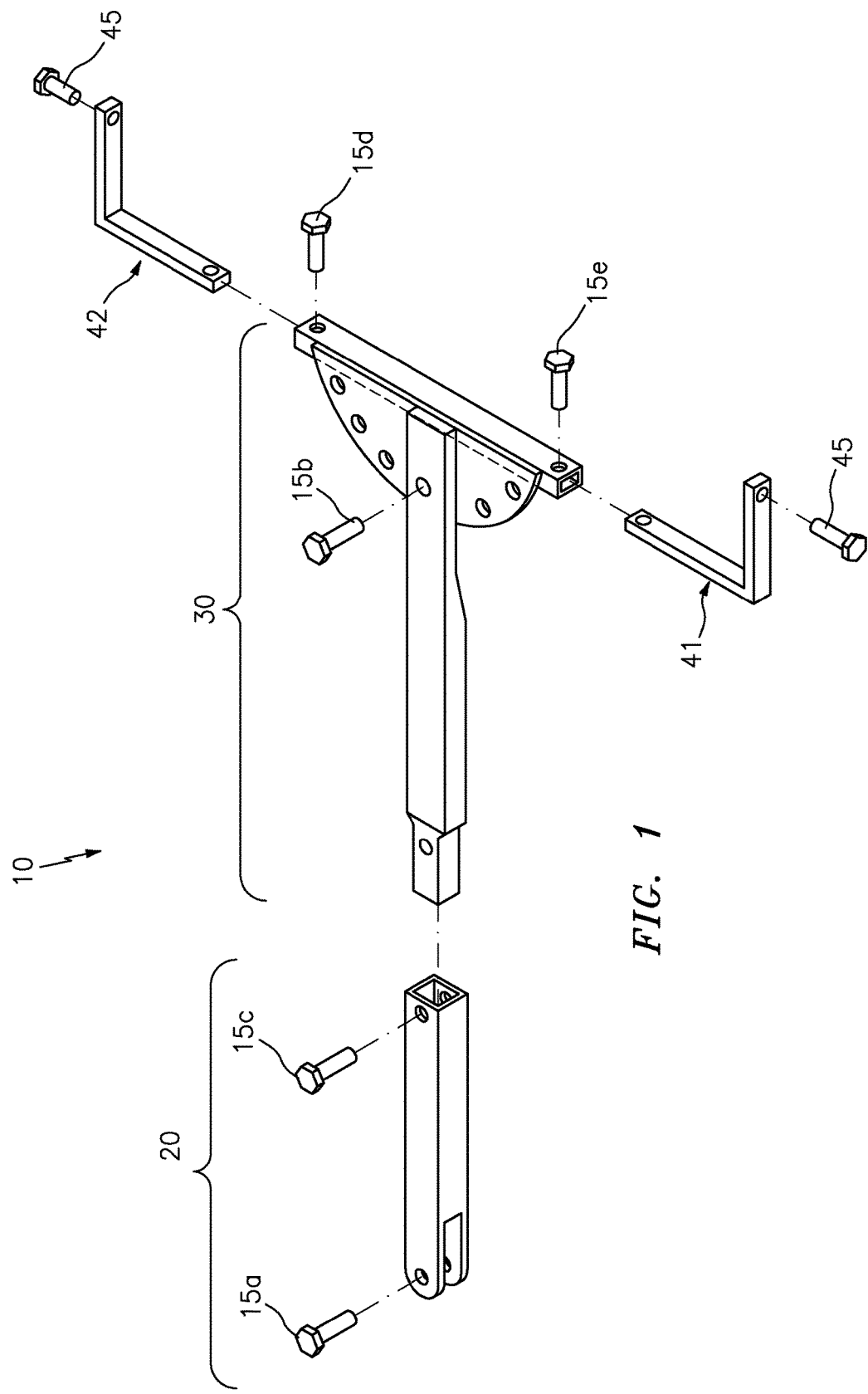
FIG. 1 is an exploded parts view of one embodiment of the universal offset lawn mower towing device that is useful for understanding the inventive concepts disclosed herein.

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

Although described throughout this document as being utilized with a riding lawn mower, this is for illustrative purposes only, as the below described device can be pulled behind any type of wheeled vehicle, without limitation. As described herein, the term "pivotally connected", "pivotally secured" and all derivatives shall be used interchangeably to describe a situation wherein two or more objects are joined together in a manner that allows one or both of the objects to rotate about or in relation to the other object. Several nonlimiting examples include pivoting couplers and swivel flanges, for example. Likewise, the term "removably secured," and derivatives thereof shall be used to describe a situation wherein two or more objects are joined together in a non-permanent manner so as to allow the same objects to be repeatedly joined and separated.

Identical reference numerals are used for like elements of the invention or elements of like function. For the sake of clarity, only those reference numerals are shown in the individual figures which are necessary for the description of the respective figure. For purposes of this description, the terms "upper," "bottom," "right," "left," "front," "vertical," "horizontal," and derivatives thereof shall relate to the invention as oriented in FIG. 1.

FIG. 1 is an exploded parts view of one embodiment of a universal offset lawn mower towing device 10 that is useful for understanding the inventive concepts disclosed herein. As shown, the device includes, essentially, a hitch engagement unit 20, an offset adjustment unit 30, and a pair of adjustable width mower attachment arms 41 and 42.

As shown, each of the above described components can include one or more apertures which can be aligned to receive a removable locking device 15. Although identified separately as elements 15a-15e, each of these elements can include identical components, or can include different components. Several nonlimiting examples of locking devices contemplated for use herein include, but are not limited to hitch pins, nut and bolt assemblies, locking hitch pins, threaded pins for engaging threaded elements located on the device components, spring loaded clips, and other such devices. The construction and use of these devices is extremely well known in the art.

Figure 2:
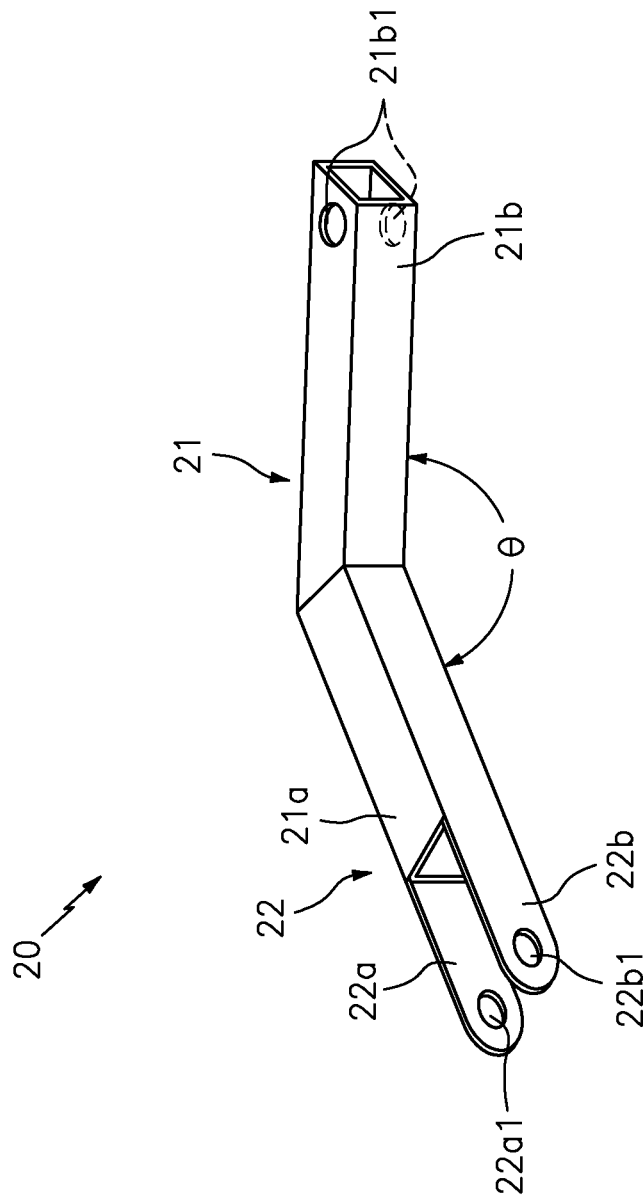
FIG. 2 is a perspective view of the hitch engagement unit of the towing device, in accordance with one embodiment of the invention.

The hitch engagement unit 20 can function to engage a trailer hitch located on the rear of a riding lawn mower. As shown in FIG. 2, the hitch engagement unit can include a first elongated shaft member 21 having an angled first end 21a, and an open second end 21b. The shaft member is preferably constructed from hollow steel tubing, and includes an aperture 21b1 along the second end. In the preferred embodiment, an angled tongue 22 extends outward from the first end of the shaft member 21a. The angled tongue can include a pair of vertically aligned steel members 22a and 22b having a pair of apertures 22a1 and 22b1 along the distal end.

As described herein, the angle θ of the tongue can be anywhere from 0 and 180 degrees along a horizontal plane and relative to the shaft member 21; however, the preferred embodiment will be approximately 45 degrees. The tongue can function in a traditional manner to engage the protruding tow hitch 6 that is located along the back center of a riding lawn mower 5 (see FIG. 6). In this regard, the tongue apertures 22a1 and 22b1 will also be positioned along a center line C of the riding lawn mower. The lip can be positioned between the members 22a and 22b, at which time apertures 22a1 and 22b1 can be aligned with the mower tow hitch aperture and secured in place via a locking device 15a.

In addition to the above, and as will be described below with respect to FIG. 7, the structure of the angled tongue can allow two separate devices 10 and 10' to be connected to a single riding mower. This can be accomplished by simply rotating the hitch unit of one of the devices 180 degrees so that the tongue of each device is angled towards the other. Such a feature advantageously provides the ability for a single riding mower to triple the cutting area being mowed at one time.

Although described above as including a pair of vertically aligned members, this is but one possible embodiment of the tongue. To this end, other embodiments are contemplated wherein the tongue includes a square steel construction having a tapered size that is designed to slidingly engage a traditional trailer receiver.

Figure 3:
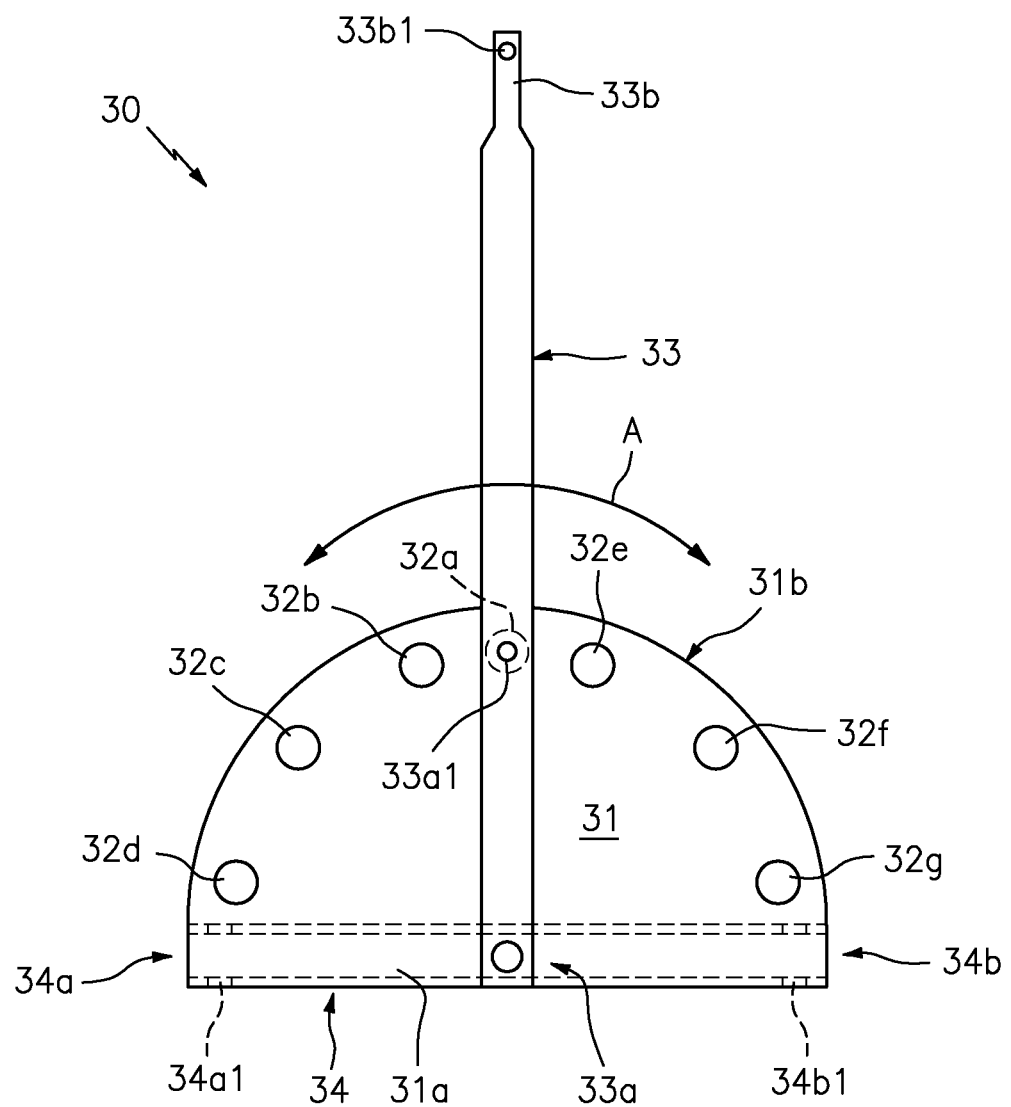
FIG. 3 is a top view of the offset adjustment unit of the towing device, in accordance with another embodiment of the invention.

The offset adjustment unit 30 is interposed between the hitch unit 20 and the mower attachment arms, and functions to allow a user to select an offset amount from the center of the riding mower C at which the upright mower will be towed. As shown in FIG. 3, the adjustment unit includes a semi-circular plate 31 having a back end 31a and a curved forward facing end 31b. A center aperture 32a is disposed at the geometric center of the curved forward end, and a plurality of evenly spaced offset apertures 32b-32g are disposed incrementally along the curved forward face.

A second elongated shaft member 33 includes a first end 33a that is pivotally secured to the top of the semi-circular plate via a coupler 34. An adjustment aperture 33a1 is positioned along the shaft 33, and can be aligned with each of the apertures 32a-32g, based on the orientation of the shaft. When so aligned, a locking device 15b can engage the apertures to prevent further movement of the shaft.

As shown by arrow a, and as described herein, alignment apertures 32a-32g can be arranged so as to allow the shaft 33 to be secured along the center of the plate 31 via aperture 32a, or at any number of different angles between 0 and 180 degrees relative to the coupler 34. When engaged to the center aperture, and secured behind a riding lawn mower, the center aperture positions the upright mower directly along the center line C of the lawn mower. Likewise, when any of the offset apertures 32b-32g are engaged, the device will be secured at a corresponding offset angle relative to the center line C of the lawn mower (See FIG. 6).

Although described and illustrated as including six individual alignment apertures 32a-32g, those of skill in the art will recognize that a fewer or greater amount of apertures can be provided.

The shaft also includes a second end 33b that extends beyond the curved forward facing end 31c of the plate, so as to be coaxially aligned with the open end 21b of the hitch unit. The second end 33b is sized for insertion within the open end of the hitch unit, and further includes an aperture 33b1. To this end, apertures 21b1 and 33b1 can be aligned to receive locking device 15c. Although described with respect to a single aperture, other embodiments are contemplated wherein one or both of the first and second elongated shafts includes a plurality of apertures so as to allow a user to adjust a distance between the hitch engagement unit and the semi-circular plate.

A mower arm receiver 34 is secured along the bottom surface of the angled plate. In one embodiment, the arm receiver 34 is constructed from square steel tubing, having an open first end 34a with corresponding aperture 34a1, and an open second end 34b with corresponding aperture 34b1. The arm receiver functions to receive and engage the below described mower attachment arms.

Figure 4A:
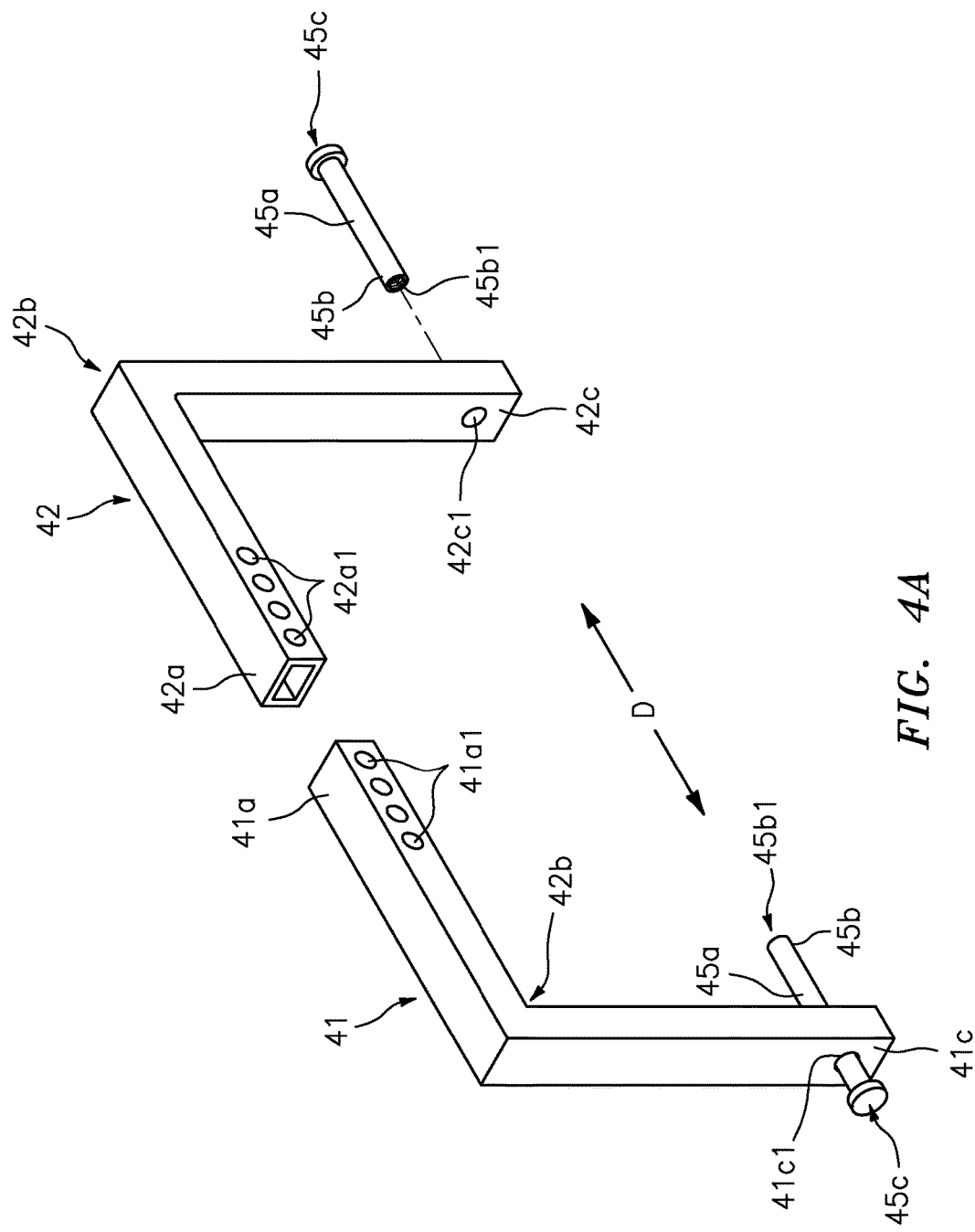
FIG. 4A is a perspective view of the mower attachment arms of the towing device, in accordance with one embodiment of the invention.

As shown in FIG. 4A, a pair of generally L-shaped mower attachment arms 41 and 42 can be provided, and can function to engage and secure an upright lawn mower 1 to the device 10. The attachment arms can include essentially identical shapes and sizes, and can be defined by first ends 41a and 42a, curved middle portions 41b and 42b, and second ends 41c and 42c, respectively. The first ends of each arm 41 and 42 being sized for insertion within the first and second ends of the arm receiver 34. As such, one or more apertures 41a1 and 42a1 can be positioned along the first ends of the arms, to allow a distance D between the second ends 41c and 42c to adjust to a width of an upright lawn mower. Once positioned and sized accordingly, the apertures 41a1 and 42a1 can be aligned with apertures 34a1 and 34b1 and locked in place via locking members 15d and 15e.

As shown, a pair of elongated mower attachment nuts 45 can be positioned within apertures 41c1 and 42c1 of the attachment arms. Each of the nuts can include an elongated main body section 45a that is disposed between an open first end 45b, and a capped second end 45c. The caped second end can include a dimension that is greater than the dimension of the main body section 45a. The capped second end can also be removable in nature either by screwing into the main body section or via an aperture and locking mechanism (not illustrated).

The first end 45b includes a plurality of threaded elements 45b1 that extend into the main body section. The open end 45a and the threaded elements include a shape and diameter that is complementary to the shape and diameter of the wheel bolts located on a traditional upright lawn mower. As such, the threaded elements 45b1 function to engage the bolts located on the front wheels 2 of an upright lawn mower 1 via a twisting motion.

Figure 4C:
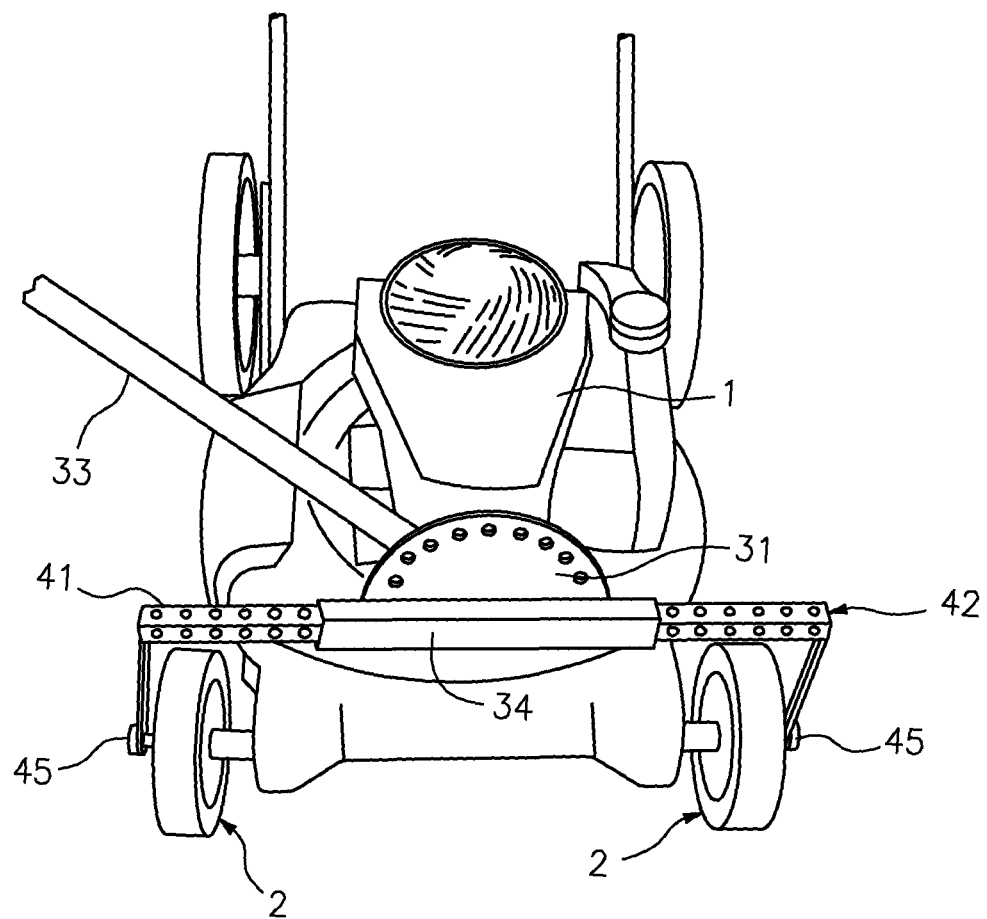
FIG. 4C is a front view of the towing device in operation, in accordance with one embodiment of the invention.

In this regard, once secured onto the front wheel bolts of an upright mower, the arms can transition the angled plate 43 between a substantially horizontal position utilized when being pulled by a riding mower (See FIG. 4B) and a substantially vertical position (See FIG. 4C) used for storage and/or when the upright mower is not being pulled by the riding mower.

Figure 5:
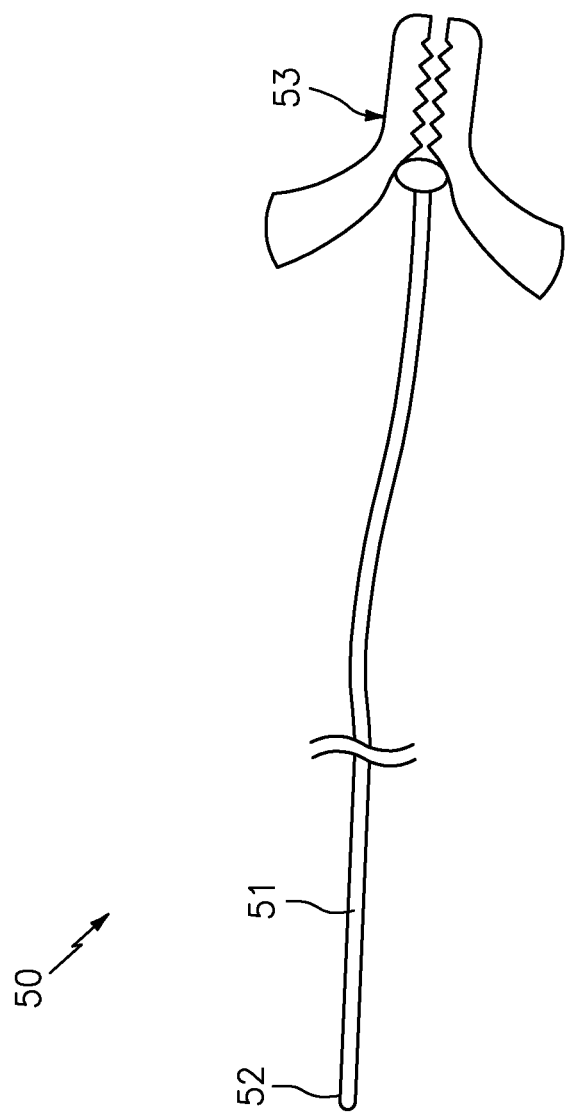
FIG. 5 is a perspective view of the safety tether of the towing device, in accordance with one embodiment of the invention.

FIG. 5 illustrates one embodiment of an optional safety tether 50 which can be provided with the towing device. As shown, the safety tether can include an elongated sturdy cable 51 such as steel, for example, having a first end 52 and a second end that terminates into a spring loaded clip 53.

Figure 6:
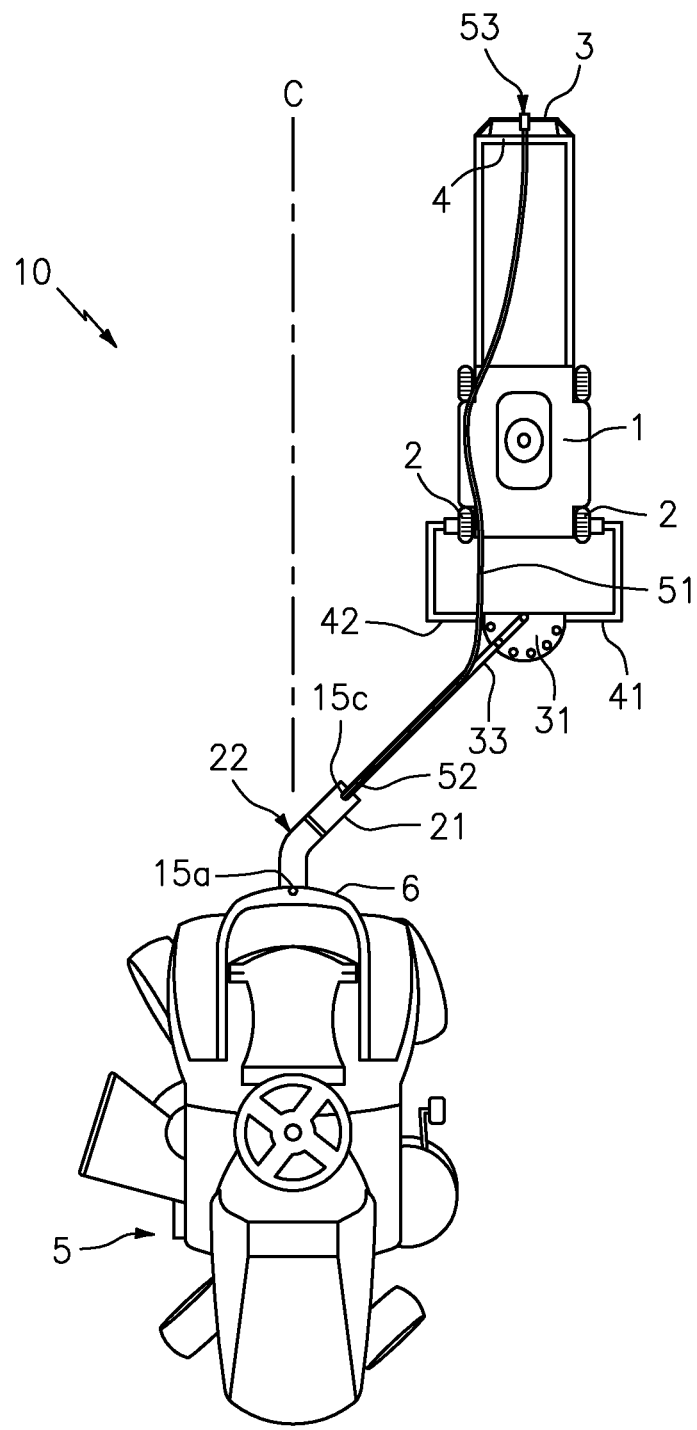
FIG. 6 is a top view of the towing device in operation, in accordance with one embodiment of the invention.

FIG. 6 illustrates one embodiment of an assembled mower towing device 10 in operation. As shown, the angled tongue 22 of the mower attachment unit is secured to the riding mower 5 as described above, and the angled plate 31 is engaged to position the upright mower 1 at an offset of approximately 45 degrees from the center of the riding mower C. Additionally, the first end of the cable 52 can be secured to one or more of the locking members and/or the riding mower 5 itself, and the spring loaded clip 53 can function to secure the safety lever 3 of the upright mower against the push handle 4.

In operation, should a situation occur wherein the upright mower becomes separated from either the device 10 or the riding mower 5, tension on the cable 51 will cause the clip 53 to disengage the safety lever 3, thereby causing the upright mower to immediately shut off. Moreover, owing to the steel cable 51, even if the mower 1 does somehow become separated from the device 10, the cable will prevent the mower from rolling downhill uncontrolled. Such features presenting a redundant level of user safety.

Figure 7:
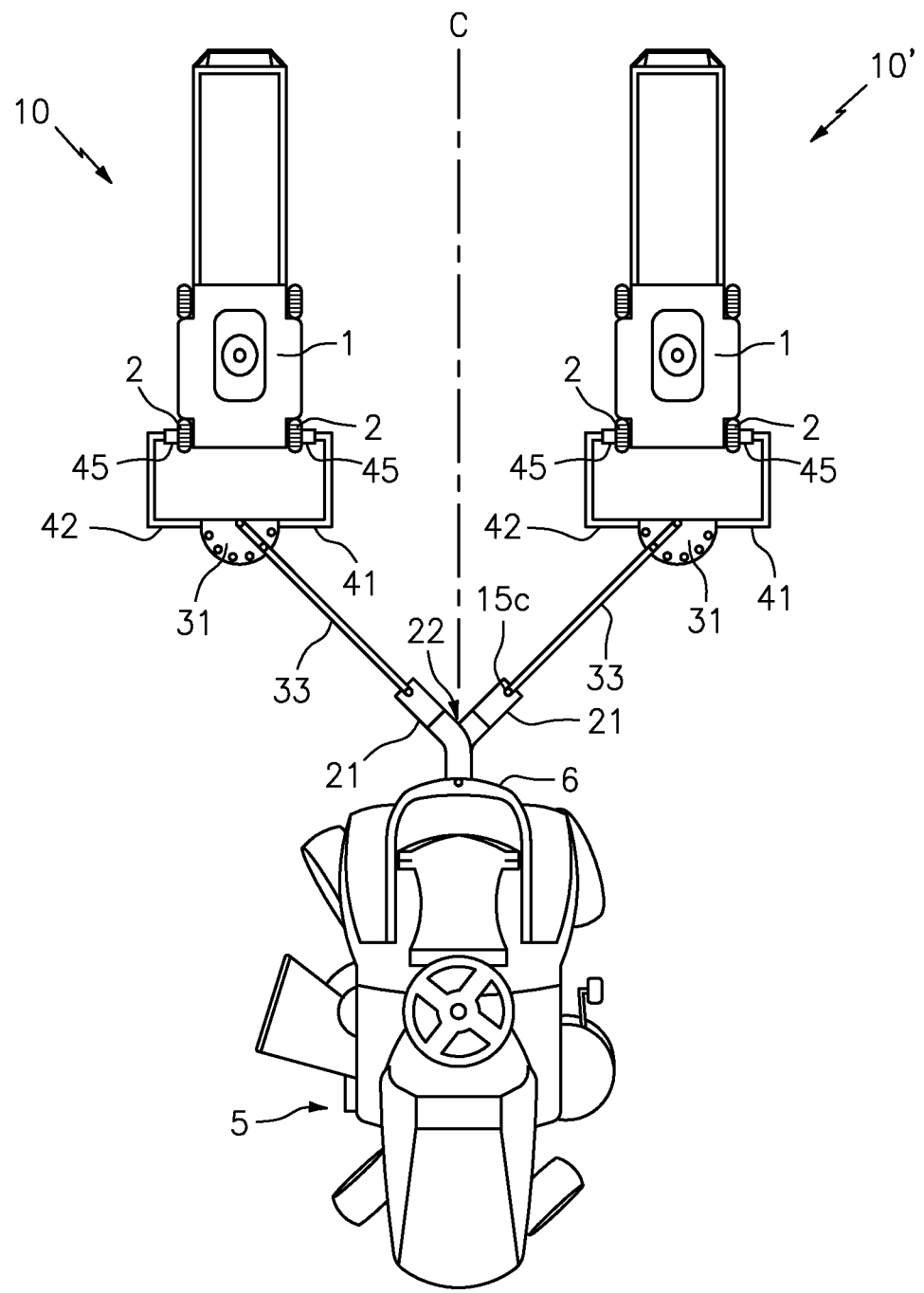
FIG. 7 is a top view of the towing device in operation, in accordance with another embodiment of the invention.

FIG. 7 illustrates another embodiment of the device in operation, wherein two mower towing devices 10 and 10' are utilized with a single riding mower 5. Such a feature allows a user to triple the cutting area being mowed by utilizing one riding mower and two upright mowers.

As described herein, one or more elements of the universal offset lawn mower towing device 10 can be secured together utilizing any number of known attachment means such as, for example, screws, glue, compression fittings and welds, among others. Moreover, although the above embodiments have been described as including separate individual elements, the inventive concepts disclosed herein are not so limiting. To this end, one of skill in the art will recognize that one or more individual elements of the hitch unit 20, the offset adjustment unit 30, and/or the mower attachment arms, for example, may be formed together as one continuous element, either through manufacturing processes, such as welding, casting, or molding, or through the use of a singular piece of material milled or machined with the aforementioned components forming identifiable sections thereof.

As to a further description of the manner and use of the present invention, the same should be apparent from the above description. Accordingly, no further discussion relating to the manner of usage and operation will be provided.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A universal offset device for towing a push-type lawn mower, said device comprising:
   a hitch engagement unit that includes a tongue that is in communication with a first end of a first elongated shaft member having an open second end;
   an offset adjustment unit that includes:
      a semi-circular plate having a curved forward facing end with a plurality of alignment apertures disposed thereon,
      a second elongated shaft member that is pivotally secured to the semi-circular plate at a first end, and is removably secured within the open second end of the first elongated shaft member, and
      a mower arm receiver that is secured along the semi-circular plate, said mower arm receiver including an elongated tubular member having an open first end and an open second end; and
   a pair of mower attachment arms that include:
   a first generally L-shaped arm having a first end that is slidingly positioned within the open first end of the mower arm receiver, and a second end that includes a mower attachment nut that is configured to engage a first wheel of the push-type lawn mower, and
   a second generally L-shaped arm having a first end that is slidingly positioned within the open second end of the mower arm receiver, and a second end that includes another mower attachment nut that is configured to engage a second wheel of the push-type lawn mower,
   wherein each of the first and second generally L-shaped arms are independently secured within the mower arm receiver, and a distance between the second ends of each of the mower attachment arms is adjustable.

2. The device of claim 1, wherein the tongue includes a pair of vertically aligned steel plates having a pair of vertically aligned apertures disposed along distal ends thereof; and further includes a locking device configured to engage each of the vertically aligned apertures.

3. The device of claim 1, wherein the tongue is oriented at an angle of approximately 45 degrees relative to the second end of the first elongated shaft member.

4. The device of claim 1, wherein each of the first and second elongated shaft members include apertures that are configured to be aligned with each other to receive a locking device.

5. The device of claim 1, further comprising:
an adjustment aperture that is disposed along the second shaft member, said adjustment aperture being configured to align with each of the alignment apertures located on the semi-circular plate; and
a locking device, that is configured to engage the adjustment aperture and one of the alignment apertures.

6. The device of claim 5, wherein one of the alignment apertures is positioned at a geometric center of the curved forward facing end of the semi-circular plate.

7. The device of claim 5, wherein each of the alignment apertures represent an offset angle relative to a center line of a riding lawn mower towing the device.

8. The device of claim 1, further comprising:
a first aperture that is located adjacent to the open first end of the mower arm receiver;
a second aperture that is located adjacent to the open second end of the mower arm receiver; and
a plurality of apertures that are positioned along each of the first and second generally L-shaped arms and located adjacent to the first ends thereof.

9. The device of claim 8, further comprising:
a first attachment device that is configured to engage one of the plurality of apertures located on the first mower attachment arm and the first aperture located on the mower arm receiver; and
a second attachment device that is configured to engage one of the plurality of apertures located on the second mower attachment arm and the second aperture located on the mower arm receiver.

10. The device of claim 1, wherein each of the elongated mower attachment nuts comprises: an elongated main body section that is disposed between an open first end, and a capped second end,
wherein said second end includes a dimension that is greater than a dimension of the main body section.

11. The device of claim 10, further comprising:
a plurality of threaded elements that are disposed within the open first end of each of the mower attachment nuts,
said open first end and threaded elements including a shape and size that is configured to engage a front wheel bolt located on the first and second wheels of the push-type lawn mower.

12. The device of claim 1, wherein each of the offset adjustment unit and the pair of mower attachment arms are configured to rotate along the mower attachment nut and the another mower attachment nut to transition between a generally horizontal position and a generally vertical position.

13. The device of claim 1, further comprising:
a safety tether that includes an elongated steel cable having a spring loaded clip along a second end, said clip including a shape and dimension that is configured to engage a safety lever and push handle of an upright lawn mower.

* * * * *